(12) United States Patent
Lu et al.

(10) Patent No.: US 6,684,121 B1
(45) Date of Patent: Jan. 27, 2004

(54) REAL TIME WORK-IN-PROCESS (WIP) SYSTEM

(75) Inventors: Yu-Cheng Lu, Feng-Yuan (TW); Wei-Kuo Yen, Hsin-Chu (TW); Jyh-Horng Chen, Dung Chiu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/439,924

(22) Filed: May 16, 2003

(51) Int. Cl.[7] ............................................. G06F 19/00
(52) U.S. Cl. ..................... 700/108; 700/253; 702/182; 707/102
(58) Field of Search ................... 700/108, 17, 253, 700/19, 110; 702/182; 707/102; 709/107; 710/1

(56) References Cited

U.S. PATENT DOCUMENTS

| | | | |
|---|---|---|---|
| 5,548,535 A | * 8/1996 | Zvonar | 702/81 |
| 5,634,039 A | * 5/1997 | Simon et al. | 700/253 |
| 5,768,133 A | 6/1998 | Chen et al. | 364/468.01 |
| 5,971,585 A | 10/1999 | Dangat et al. | 364/468.08 |
| 6,049,742 A | 4/2000 | Milne et al. | 700/99 |
| 6,128,588 A | 10/2000 | Chacon | 703/6 |
| 6,243,612 B1 | 6/2001 | Rippenhagen et al. | 700/100 |
| 6,298,377 B1 | * 10/2001 | Hartikainen et al. | 700/17 |
| 6,535,776 B1 | * 3/2003 | Tobin et al. | 700/110 |

* cited by examiner

Primary Examiner—Albert W. Paladini
(74) Attorney, Agent, or Firm—George O. Saile; Stephen B. Ackerman; Billy Knowles

(57) ABSTRACT

A process monitor system collects process execution status data such as work-in-process information from multiple manufacturing execution systems controlling multiple fabrication lines of factories of a firm. The process monitor system converts and encapsulates the process execution status data with a common standard formatting. The process execution status data is then published to subscribers of specific subjects of the process execution status data. The converted and encapsulated process execution status data is logged to a message ledger to certify publication and receipt by subscribers. A periodic diagnostic messaging or heartbeat is transmitted between elements processing and publishing the process execution status data to provide failure recovery. The elements processing and publishing the process execution status data are connected as a distributed queue of parallel process and have a designated scheduler to provide a balancing of loading.

57 Claims, 8 Drawing Sheets

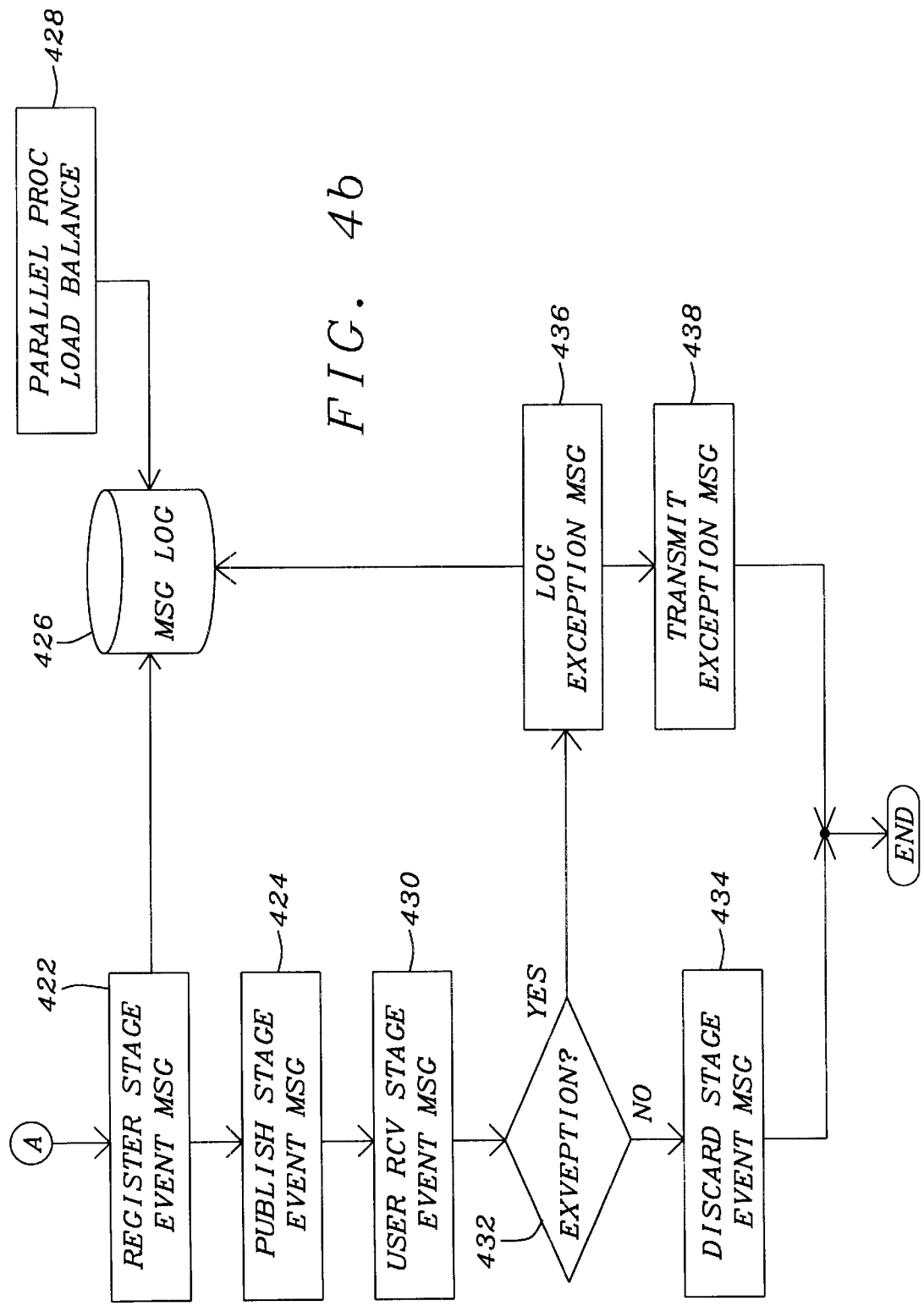

REAL TIME WORK-IN-PROCESS (WIP) SYSTEM

BACKGROUND OF THE INVENTION

1. Field of the Invention

This invention relates generally to methods and systems for compiling and publishing process execution status data such as work-in-process information, for fabrication and processing equipment of manufacturing lines from manufacturing execution systems. More particularly, this invention relates to event driven methods and systems for receiving, converting, tracking and publishing work-in-process status created from manufacturing execution systems.

2. Description of Related Art

In firms such as semiconductor fabrication companies, there are numerous factories at various locations. Each of the factories may have multiple fabrication lines, employing different sets of processing equipment. Currently most fabrication lines are highly automated and controlled by manufacturing execution systems (MES). The MES receive scheduling information regarding the product to be manufactured. From the scheduling information, the MES schedules the necessary processing equipment and distribution of the raw materials. The MES then starts the manufacturing process and provides monitoring of the processing equipment. The progress of each stage of the manufacturing is logged and any exceptions, such as scrapping of a lot due to failure or contamination of the processing equipment, are further noted.

Traditionally, the status of progress of the product being manufactured is collected in a Work-in-Process (WIP) database. The collection occurs on a periodic basis (daily). Each of the fabrication lines of the factories may have MES's that are created by different companies and therefore do not have consistent interfaces to provide the status of the progress. Further, the communication link from the MES's to the WIP database may fail resulting in loss of time in recovering the status. The WIP database must be processed to recover the pertinent information that is required to inform a customer of the progress of the fabrication of the product. Such information includes holding of fabrication of a lot, scrapping of a lot, or initiation of a new fabrication lot. The delay of the information causes delays in decision making on the part of a customer.

U.S. Pat. No. 6,243,612 (Rippenhagen, et al.) describes a system for scheduling processing of lots which are distributed among various processing system stations. Process scheduling is determined in accordance with lot specific composite ratios, which are a function of process scheduling factors. Such process scheduling factors include, for example, a processing system efficiency, customer factors, and market factors. Processing system efficiency is influenced by a hunger ratio which is a ratio of the time when a particular lot is needed by a next constraint resource in the lot's process flow and the planned cycle time of a selected to such next constraint resource. Customer factors include a critical ratio of the lateness of a lot relative to the lot's due date, and market factors reflect the relevant market priority of the lot. The process scheduling factors may be weighted to control their influence on the composite ratio.

U.S. Pat. No. 5,768,133 (Chen, et al) discusses a WIP/move management tool for semiconductor manufacturing plant that includes a shop floor control system. A server contains a data engine for extracting data, a load and transform data unit, and a database management storage unit. Data from the shop floor control system is supplied to the data engine in the server. The data engine can run the shop floor control system. The data engine supplies data received from the shop floor control system to the load and transform data unit. The load and transform data unit supplies data to the database management storage unit where the data is stored in a disk storage unit in storage space allocated to a conventional database management system employed for the purpose of management of data.

U.S. Pat. No. 5,971,585 (Dangat, et al.) teaches a computer implemented decision support tool that serves as a solver to generate a best can do (BCD) match between existing assets and demands across multiple manufacturing facilities. Boundaries are established by manufacturing specifications and process flows and business policies to determine which demands can be met in what time frame by microelectronics (wafer to card) or related (for example disk drives) manufacturing facilities. A set of actions or guidelines for manufacturing are established to incorporate into the manufacturing execution system to insure the delivery commitments are met in a timely fashion. The BCD tool has six major components, a material resource planning explode or "backwards" component, an optional start evaluator component, an optional due date for receipts evaluator, an optional capacity available versus needed component, an implode "forward" or feasible plan component, and a post processing algorithm.

U.S. Pat. No. 6,049,742 (Milne, et al.) describes a computer-implemented decision-support tool. The decision support tool serves as a solver to generate a projected supply planning (PSP) or estimated supply planning (ESP) match between existing assets and demands across multiple manufacturing facilities. Boundaries are established by the manufacturing specifications and process flows and business policies to determine what supply can be provided over what time-frame by manufacturing. These boundaries establish a set of actions or guidelines for manufacturing to incorporate into their manufacturing execution system to ensure that the delivery commitments are met in a timely fashion.

U.S. Pat. No. 6,128,588 (Chacon) teaches an integrated wafer fabrication production characterization and scheduling system. The integrated wafer fabrication production characterization and scheduling system incorporates a manufacturing execution system with a scheduling system based on simulation. The integrated characterization/scheduling system provides manufacturing with a simulation tool integrated with the manufacturing execution system to evaluate proposed production control logic as a practical alternative to expensive experimentation on actual production system. Furthermore, simulation models are used to create short term dispatch schedules to steer daily manufacturing operations towards planned performance goals.

SUMMARY OF THE INVENTION

An object of this invention is to provide a system to collect process execution status data such as work-in-process information from multiple manufacturing execution systems controlling multiple fabrication lines of factories of a firm.

Another object of this invention is to provide a system to convert and encapsulate the process execution status data with a common standard formatting.

Further, another object of this invention is to publish the process execution status data to subscribers of specific subjects of the process execution status data.

Still further, another object of this invention is to certify publication and receipt by subscribers of the process execution status data.

Even still further, an object of this invention is to provide a periodic diagnostic messaging between elements processing and publishing the process execution status data.

Still, another object of this invention is to provide a balancing of loading of elements processing and publishing the process execution status data by distributing the scheduling of the processing and publishing with different elements.

To accomplish at least one of these objects and other objects, a process monitor system is in communication with a process execution system such as a manufacturing execution system to receive process execution status data (work-in-process status) and publish compile and publish the process execution status data to subscribers. The process monitor system has a publication device, in communication with the process execution system for receiving the process execution status data (stage change). The process execution status data is transmitted to the publication device when an event of the process causes a change in the process execution status data. The publication device then converts and encapsulates the process execution status data to a standardized format for publication. The communications adaptor encapsulates the process execution status data with metadata identifying data types and data structures of the process execution status data.

The process monitor system has at least one message certification processor. Each message certification processor is in communication with the publication device to receive the converted and encapsulated process execution status data. Each message certification processor then logs receipt of the converted and encapsulated process execution status data and verifies receipt by each subscriber of the converted and encapsulated process execution status data. The message certification processor maintains message ledger files for logging publication and receipt of the converted and encapsulated process execution status data.

The process monitor system has at least one status tracking device. Each status tracking device is in communication with the publication device to receive the converted and encapsulated process execution status data. Each status tracking device reviews the encapsulation information of designated converted and encapsulated process execution status data and from the designated encapsulation information compiles and transfers the designated converted and encapsulated process information to the subscribers.

The status tracking device is in communication with the message certification processor to identify subscribers for each converted and encapsulated process execution status data for the logging of publishing and receipt of the converted and encapsulated process execution status data.

An execution status subscriber database is in communication with the status tracking device and the message certification processor to receive and provide data records identifying subscribers. Further, each of the subscriber's information includes the encapsulation information identifying the converted and encapsulated process execution status data the subscribers are to receive.

The message certification processors and the status tracking devices each form a distributed queue of processors. One of the message certification processors and one of the status tracking devices is designated a scheduling processor to balance a loading respectively of all of the message certification processors and all of the status tracking devices.

The process monitor system, further, includes an exception monitor. The exception monitor is in communication with the publication device, each of the message certification processors, and each of the status tracking devices to record all exception errors that occur and to provide an alarm message when exception error occurs. An autonomous monitoring device is in communication with the publication device, each of the message certification processors, and each of the status tracking devices to monitor a diagnostic message generated by the publication device, each of the message certification processors, and each of the status tracking devices. The diagnostic message periodically indicates an operational state of the publication device, each of the message certification processors, and each of the status tracking devices and if the operational state indicates a failure and then transmits a failure alarm.

If any of the message certification processors or status tracking devices indicates an operational state having a failure, the message certification processor or the status tracking device designated as the scheduler reassigns the converted and encapsulated process execution status data to surviving message certification processors or status tracking devices of the group including the failed element.

An archiving device is included in the process monitor system and is connected to the publication device, each of the message certification processors, and each of the status tracking devices. The archiving device periodically archives the process execution status data, a listing of the subscribers, each logged receipt and verified receipt.

BRIEF DESCRIPTION OF THE DRAWINGS

FIGS. 4a and 4b are flow diagrams of the method for monitoring and processing WIP status data of this invention.

DETAILED DESCRIPTION OF THE INVENTION

The WIP processing system of this invention receives the WIP status data from the MES for each manufacturing line whenever an event occurs that causes a change in status. Each stage of a process causes a change in status, as does a failure of a process, which causes scrapping of the product being fabricated. Further, a hold may be placed on processing due to lack of a raw material or failure of a piece of equipment. A hold may occur if the customer reschedules the shipment of the product. Any hold would therefore cause a change in the WIP status data and thus communication of that status to the WIP processing system. As described above, there are many differing MES systems that may be employed for the various manufacturing lines with the factories of an enterprise. The WIP processing system converts the WIP status data to a common format and further wraps or encapsulates the WIP status data with metadata, which categorizes the WIP status data. The WIP processing system then logs the converted and encapsulated WIP status data for publication to subscribers of the subject of the WIP status data as identified in the encapsulation. When the subscriber receives the converted and encapsulated WIP status data, an acknowledgement of the receipt is recorded to certify the receipt of the WIP status data.

The WIP processing system has multiple processing elements, which are described hereinafter, that are formed as a parallel distributed queue of processors. The processors elect or select one of the processors as a scheduler. The scheduler receives the converted and encapsulated WIP status data and dispatches the converted and encapsulated WIP status data to balance the loading of the remaining processors.

The WIP processing system has an exception processor that monitors a periodic diagnostic message or heartbeat to examine the functioning of the individual processors of the WIP processing system. If any of the processors fail or any of the converted and encapsulated WIP status data indicates an exception has occurred, the exception processor transmits an alarm to a responsible person. If one of the processors has failed, the scheduler reassigns the converted and encapsulated WIP status data to the remaining processors for processing.

Further, the WIP processing system provides an archive of the WIP status data and the subscribers to the WIP status data with the subject interests at a particular point in time. The archive is time dependent on the types of subjects of the WIP status data. Scrap events are archived more often than normal stage changes as the product proceeds through the fabrication.

Figure 1:
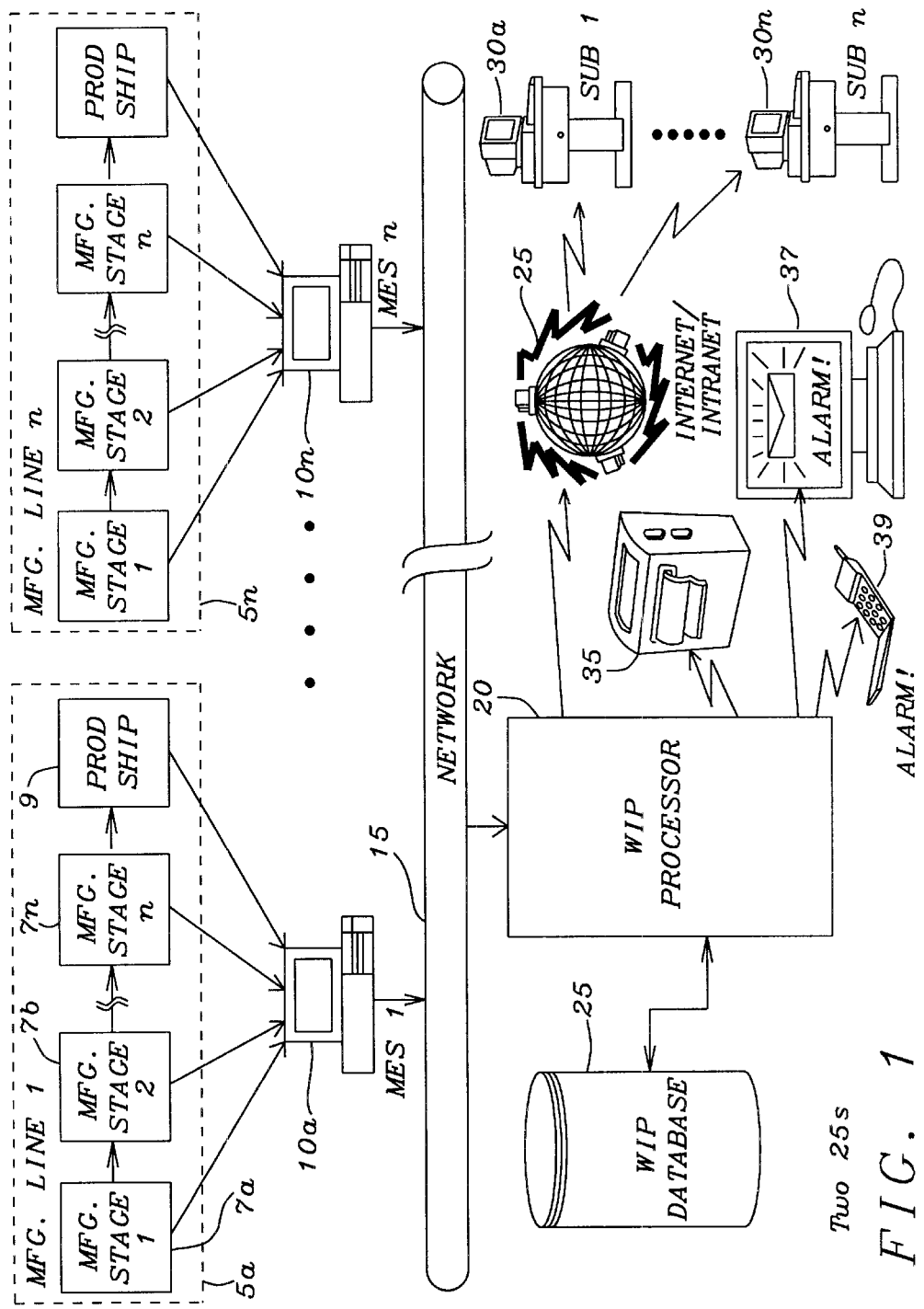
FIG. 1 is a system diagram of a manufacturing enterprise incorporating the WIP monitor processor of this invention.

Refer now to FIG. 1 for a description of the WIP status data processing system of this invention. A factory or factories of a manufacturing enterprise have multiple manufacturing or fabrication lines 5a, . . . , 5n with multiple manufacturing stages 7a, 7n for fabrication of products produced by the enterprise. In the case of a semiconductor foundry, the manufacturing stages are different pieces or groups of pieces of fabrication equipment that perform the operations necessary for creating integrated circuits on a substrate. In the foundry environment, the process for each stage 7a, . . . , 7n is different for a different product and requires precise monitoring and scheduling for efficient use of the various manufacturing lines 5a, . . . , 5n. Upon completion of the fabrication of the product, the product is scheduled for shipment 9.

The control and scheduling of each of the stages 7a, . . . , 7n, and 9 is controlled by a manufacturing execution system (MES) 10a, . . . , 10n. For the WIP processing system of this invention, the MES 10a, . . . 10n transmits a WIP status data, when a change in stage occurs, particularly changes in stage that involve scrapping of product or delaying or holding of product that may delay shipment of the product. Since each MES 10a, . . . , 10n may be have a different company creating the MES, the WIP status data may have differing code structure from different MES's 10a, . . . , 10n.

The WIP status data is transmitted to the network 15. The network maybe any internal company network or a global digital communication network such as the internet. The WIP status data is received by the WIP processor system 20 for conversion, encapsulating, and publication to subscribers 30a, . . . , 30n. Any exceptions or errors detected by the WIP processor 20 are transmitted as an alarm by way of electronic mail (email) 37, a brief message to a telephone 39, or a paging signal 35. The converted and encapsulated WIP status data is retained in a WIP database 25 to log the publication of the WIP status data. Further the listing of the subscribers and their subjects of interest are retained in the WIP database 25.

Figure 2:
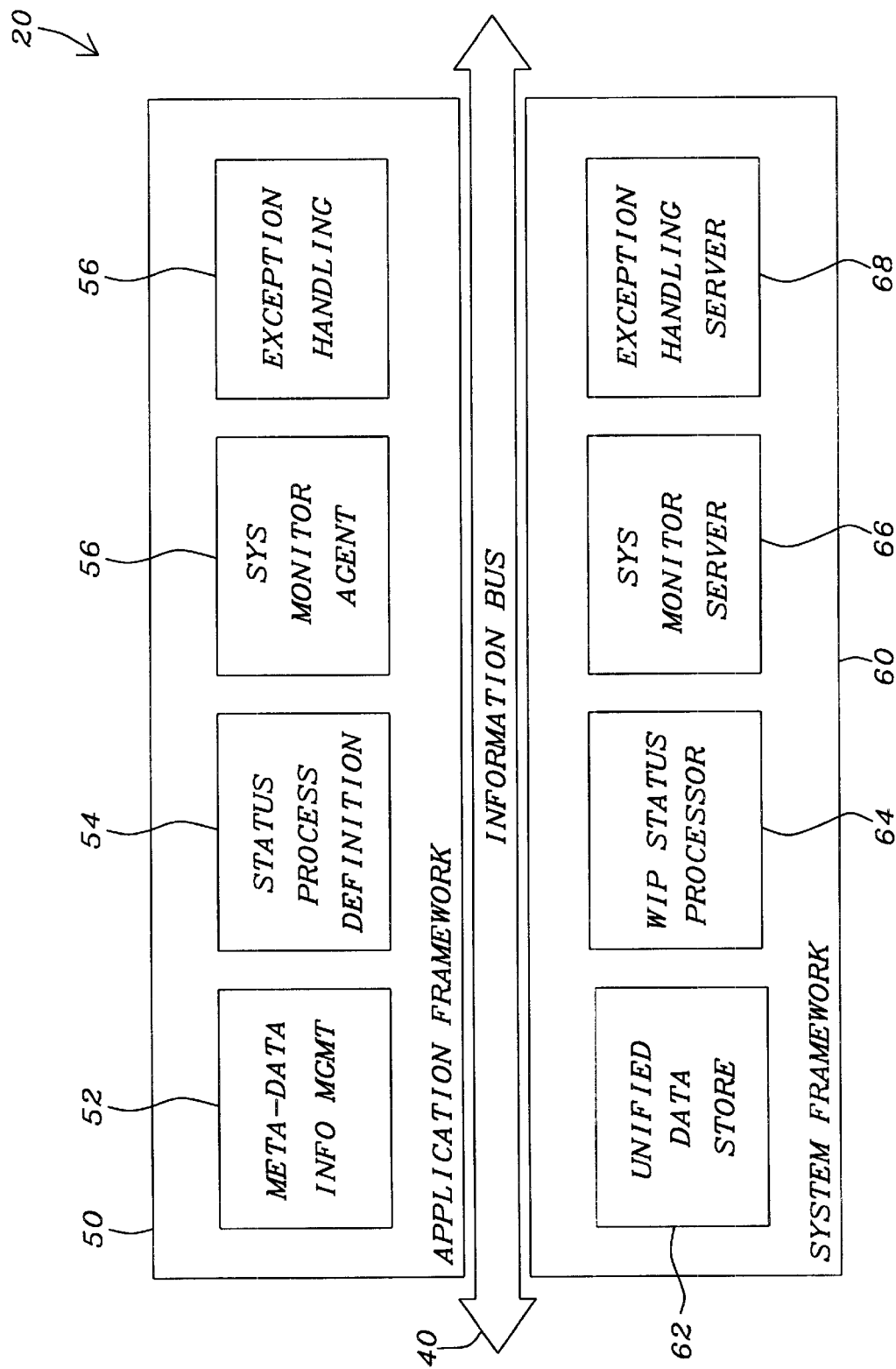
FIG. 2 is application and system framework of the WIP monitor processor of this invention.

Referring now to FIG. 2, the WIP processor 20 consists of the application framework 50 and the system framework 60. The application framework 50 describes the processes that executed by the WIP processor 20. The system framework 60 describes the physical structure of the system which is used to execute the application processes.

The application framework 50 has a meta-data information management process 52 that is used to determine the structure of the WIP status data that is transmitted from the network 15 to the information bus 40 from the individual MES's 10a, . . . , 10n. The structure of the WIP status data provides the types of information and the coding structure included in the WIP status data. The meta-data information management process 52 provides the necessary format conversion information of the WIP status data as transmitted from the MES's 10a, . . . , 10n. The metadata information management process, further, provides the encapsulation information for the WIP status data. The WIP status data is encapsulated by the meta-data information management process 52 with a "wrapper" or segment of code providing information about the structure of the coding structure of the WIP status data. The meta-data of the preferred embodiment is specified as extensible markup language (XML) as known in the art. The encapsulating of the WIP status data with the XML meta-data permits a user requiring only certain types or subjects of the WIP status data such as scrapped lots or lots on hold or delayed for particular reasons to subscribe to receive only the WIP status data pertaining to those subjects.

The application framework 50 includes a status process definition procedure 54 that is used compile and transfer the encapsulated WIP status data The encapsulation of the WIP status data with the XML meta-data allows the status process definition procedure 54 to compile and transfer to a user the WIP status data requiring only certain types or subjects of the WIP status data. The subjects of the WIP status data included such subjects as scrapped lots or lots on hold or delayed for particular reasons. The user subscribes only the WIP status data pertaining to those subjects it is required to receive.

A diagnostic message or heartbeat is generated periodically to verify that the elements of the WIP processor are functioning or if they have failed. The system monitor agent 56 is a program process that tracks the heartbeat and if a failure is detected, initiates an automatic recovery of the failed element. Further the system monitor agent 56 causes the processes being performed by the failed elements to be distributed to other elements of the WIP processor 20.

The system monitor agent 56, upon detecting a failure of any element, informs the exception handling process 58. The exception handling process then generates an alarm to be transferred by electronic mail, telephone or pager to a responsible person to initiate repair of the failed element. Further, the status process definition procedure 54 will inform the exception handling process 58 of any of the WIP status data that require immediate attention. The exception handling process then provides the necessary alarms to the responsible person.

The system framework has an unified data storage 62 that will receive and retain the converted and encapsulated WIP status data as generated by the meta-data information management 52. Further, the unified data storage 62 retains the listings of the users and the subjects of the WIP status data to which the users are subscribed.

The WIP status data processor 64 executes the meta-data information management process 52 and the status process definition procedure 54 to convert, encapsulate, compile, and transfer the WIP status data to the subscribing user. The WIP status data processor 64 communicates the converted and encapsulated WIP status data to the unified data store 62 for retention. The WIP status data processor 64 communicates with the system monitor server 66 the results of the diagnostic heartbeat messaging. Notification of any failures are transferred to the exception handling server 68, which generates the physical commands to transfer the alarm by electronic mail, telephone, or pager. The WIP status data processor 64 also communicates with the exception handling server 68 to create the necessary commands for the physical alarm.

Figure 3:
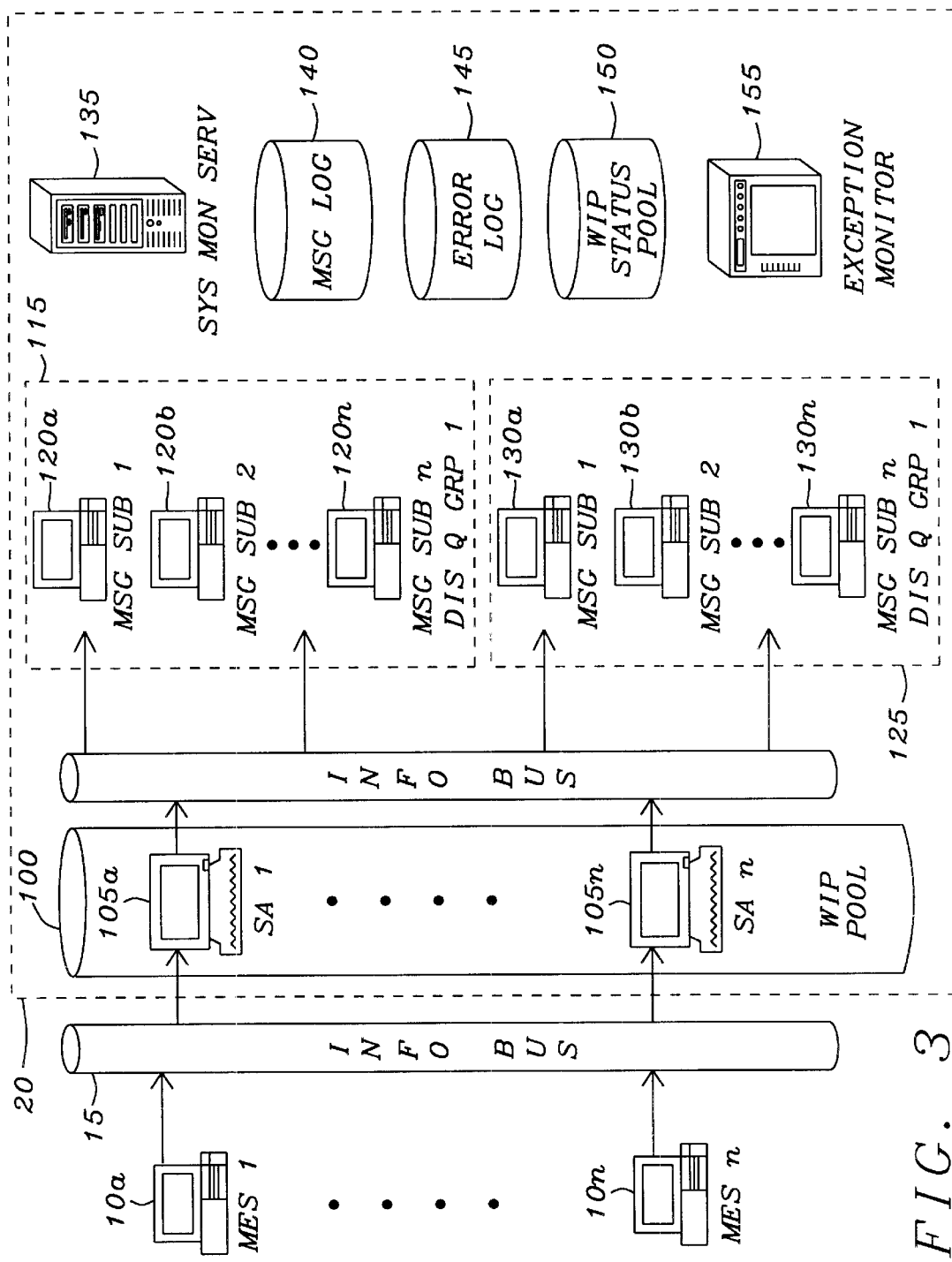
FIG. 3 is a structural diagram of the WIP monitor processor of this invention.

Refer now to FIG. 3 for a description of a physical construction of the WIP processor 20. The MES's 10a, ..., 10n are programmed at the occurrence of any stage change of the WIP during the fabrication of the product. A change in stage maybe the scrapping of the lot of product due to contamination of the raw materials or malfunction of the processing equipment. Other stage changes maybe delays or holding of the processing of the WIP due to delays and congestion of the process flow or due to orders from the customer delaying the fabrication of the product. Even other stage change messages maybe generated for the dispatching of a new product for fabrication. Routine stage change messages are also generated as the product progress through each workstation or piece of fabrication equipment. As described above, each of these messages may have a unique format or structure as well as differing subjects that are of interest to the customer and to responsible personnel of the manufacturing enterprise.

The WIP status data messages describing the stage changes are transferred via the information bus or network 15 to the WIP Processor 20. The first component of the WIP processor to receive the WIP status data messages is the WIP Pool 100. The WIP pool 100 is composed of supply adapters 105a, ..., 105n. The supply adapters 105a, ..., 105n subscribe to particular types or subjects of the WIP status data as it is transferred or (published) by the MES's 10a, ..., 10n. The supply adapters 105a, ... 105n perform the meta-data information management process 52 of FIG. 2 to modify the format the WIP status data to a uniform format and encapsulate the WIP status data with meta-data tags to assist in describing and processing the WIP status data information. The meta-data tags in the present embodiment are formed in the extensible markup language (XML) to provide the necessary structure for the WIP status data that will allow changes in the content and structure of the WIP status data with having to change programs of processors performing subsequent operations on the WIP status data.

Each of the supply adapters 105a, ..., 105n transfers the converted and encapsulated WIP status data to the information bus 110. The information bus 110 is a network that provides a communication link for the supply adapters 105a, ..., 105n to the remaining elements of the WIP processor 20. Each of the message log subscriber processors 120a, ... 120n receive the converted and encapsulated WIP status data dependent upon a subject or contents of the encapsulation information, which message log subscriber processors 120a, ..., 120n subscribe or are programmed to accept. The message log subscriber processors 120a, 120n are in communication with the WIP status data pool database 150. The message log subscriber processors 120a, ..., 120n transfer the converted and encapsulated WIP status data to the WIP status data pool database 150 based on the subject or contents of the encapsulation information. The encapsulation information is often referred to as a "business wrapper" and describe the types of business decisions that are to be made from the information of WIP status data. The encapsulating or wrapping of the WIP status data labels the information such that the message log subscriber processors 120a, ..., 120n can compile the WIP status data appropriately for storing in the WIP status data pool database 150.

The message log subscriber processors 120a, ..., 120n detect any exception such as scrapping or equipment failure and is extracted and transferred to the exception monitor 155 for communication of an alarm 35, 37, 39, to a responsible party. Further, the exception is stored to the error log database 145 for future problem or error tracking.

Each of the WIP adapters 130a, ..., 130n are connected to the information bus 110 to receive the converted and encapsulated WIP status data. The WIP adapters 130a, ..., 130n receive the converted and encapsulated WIP status data also based on the subject or encapsulation of the WIP status data. In this case the WIP adapters 130a, ..., 130n process the WIP status data based on the encapsulation or "business wrapper".

The message log subscriber processors 120a, ..., 120n further maintain a log of subscribers for the WIP status data and the subjects to which each subscriber desires to receive from the WIP status data. Each WIP status data is logged to a message ledger in the message log 140 upon publication by message log subscriber processors 120a, ..., 120n and upon receipt by the subscriber. This allows a certified message protocol such that no message is lost. When an abnormal event happens in the WIP processor or the communications link to the subscribers, the WIP status data is automatically resent until the designated receiver obtains the WIP status data. This includes the elements of the WIP processor 20.

The message log subscriber processors 120a, ..., 120n and the WIP adapters 130a, ..., 130n are respectively organized into a distributed queue group of parallel processors 115 and 125. Each of the group of distributed groups of parallel processors 115 and 125, at initialization, automatically select one of the message log subscriber processors 120a, ..., 120n and one of the WIP adapters 130a, ..., 130n as scheduler or control processor for the respective group. The scheduler receives the converted and encapsulated WIP status data and dispatches the converted and encapsulated WIP status data to the remaining processors and adapters dependent upon their respective loads.

The distributed queue groups of parallel processors that form the message log subscriber processors 120a, ..., 120n and the WIP adapters 130a, ..., 130n periodically dispatch a diagnostic message or heartbeat indicating the status of the processors. The processors transmit the heartbeat to adjacent processors and upon a failure of a processor the adjacent processor transfer a message to the system monitor server 135. The system monitor server 135 attempts to initiate a restart of the failing processor. During the attempted restart, the scheduler of the distributed queue group of parallel processors 115 and 125 reassigns the converted and encapsulated WIP status data messages of the processor to other processors of the group. The other processor assume the tasks of the failing processor and handle the WIP status data as though they were the failing processor, thus no processing of the WIP status data is lost.

The system monitor server 135 transfers an exception message to the exception monitor 155 for logging in the error log database 145. If the system monitor server 135 is unable to have the failing processor restart, the system monitor server 135 informs the exception monitor 155, which then generates an alarm to contact a responsible party.

An additional function of the system monitor server 135 is supervision of archiving of information and messages store in the message log database 140, the error log database 145, and the WIP status data pool database 150. The system monitor server 135 examines the information and messages and depending on a scheduling for archiving maintained by the system monitor server 135, the information and messages that were created before the scheduled dates and times are archived to a remote archival storage unit. For instance, the WIP status data for product that has completed fabrication and has been shipped is archived after a retention time of six months. Alternately, WIP status data for product that was scrapped or otherwise had its fabrication terminated, is archived after a retention time of just two months. This prevents the information and messages store in the message log database 140, the error log database 145, and the WIP status data pool database 150 from exceeding the limits placed on the table sizes and the storage space of the individual storage devices.

The WIP processor of this invention provides a unified and real-time database for subscribing users to view the WIP status data of subjects and classifications that they desire. The WIP processor logs every event that generates a WIP status data message and each of the transactions of the WIP database is easily traced through the WIP status data pool 150 and the message log database 140. The structure insures that no WIP status data message is lost and all WIP status data is compiled appropriately. The event driven mechanism that generates the WIP status data messages at the occurrence of a stage change of the fabrication of the product shortens the process cycle time and prevent overloading of the system and prevents failure of the system and the network connecting the system. Further, the WIP processor 20 having timely updating of the WIP status data permits the elimination of problems that are created because of differences in timing of the data transfer from the various MES's 10*a*, . . . , 10*n*. The WIP processor as described meets a demand for customers of a semiconductor foundry for immediate real-time information of the status of the fabrication of their products.

Figure 4A:
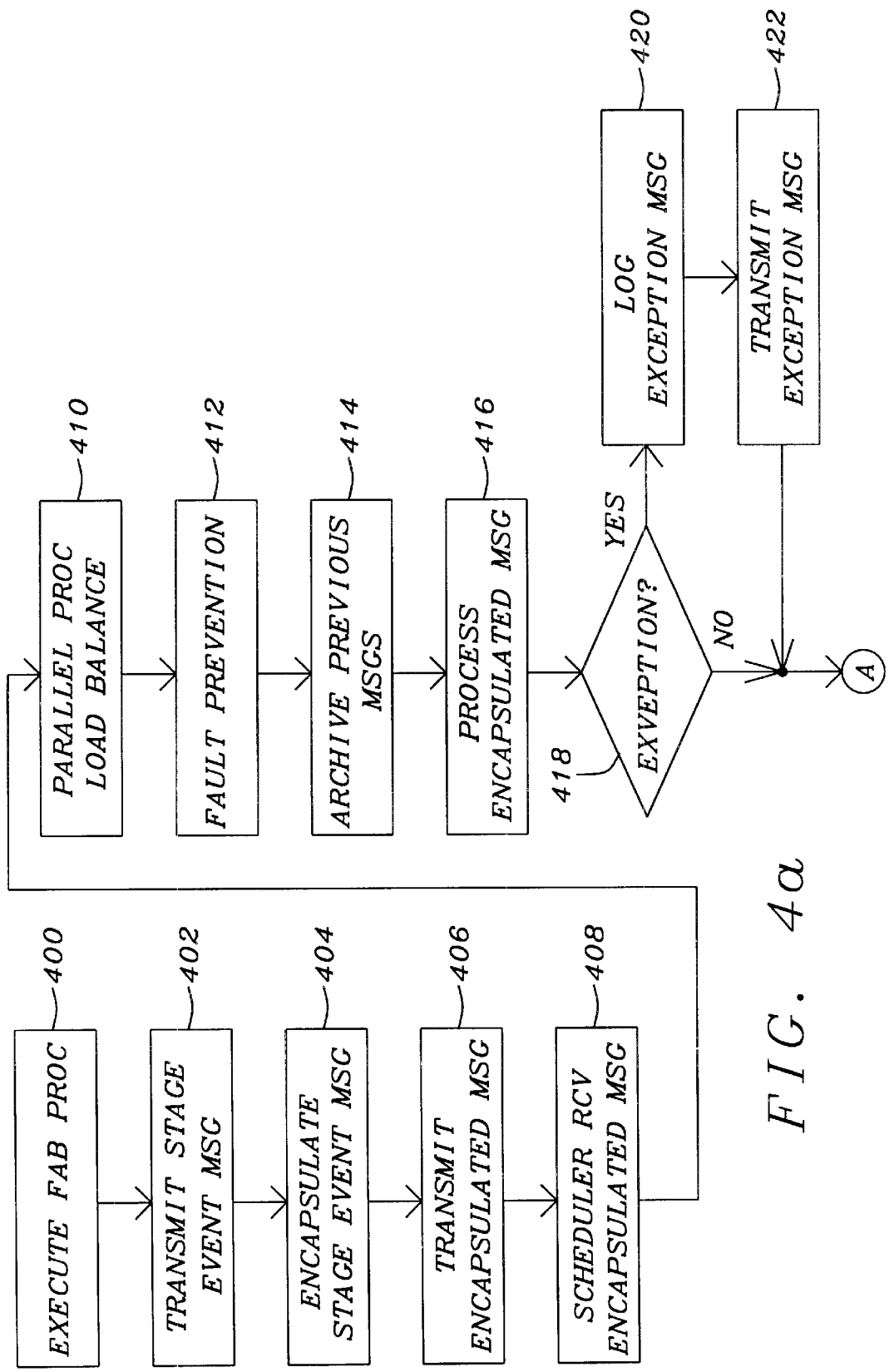

The WIP processor of this invention may actually be a network of computers executing programs that provide the function of the WIP processor. These programs are stored on data retention media such as magnetic or optical storage disks or electronic memory such as dynamic random access memory or read only memory. The program code is arranged such that, when executed on the network of computers performs a method for receiving WIP status data from MES's controlling fabrication lines of an enterprise. The method then compiles and publishes the WIP status data to subscribers. Refer now to FIGS. 4*a* and 4*b* for a description of the method for compiling and publishing the WIP status data. The scheduling and dispatch of a fabrication task leads to executing (Box 400) of the processes necessary for manufacturing products. At each change of stage of the fabrication processes, a WIP status data message is generated and transmitted (Box 402) indicating the change of stage of the product as it is processed. The stage change is normally the progression through the process. However, the stage change may indicate a scrapping of the product because of contamination of the raw materials or failure of the processing equipment. Also, the stage change may indicate a delay or hold of the processing of the product and even the initiation of a new dispatching of an order for fabrication of product.

The WIP status data containing the stage change event is converted to a standard format and/or encapsulated (Box 404) with meta-data describing the contents of the WIP status data. The converted and encapsulated WIP status data describing the event stage change is transmitted (Box 406) for further logging and processing. Each transmission of the WIP status data (Box 402) and (Box 406) is a publication to a set of subscribing processes executed on the network of computers. Each transmission is logged and each process receiving the WIP status data provides an acknowledgement of the WIP status data. If a process does not receive the WIP status data because of a failure of the computer executing the process, the process is rescheduled. When the process is next executed, the WIP status data is retransmitted until it is received by the process. This insures that no WIP status data is lost and the WIP status data is appropriately processed.

The processes that are to compile and log the WIP status data are executed on computers networked to form a distributed queue of parallel computers. One of the computers is elected as the scheduler for the distributed queue. The scheduler of the distributed queue receives (Box 408) the converted and encapsulated WIP status data containing the stage event change messages. The scheduler reviews the loading of the remaining computers within the distributed queue and dispatches the converted and encapsulated WIP status data to balance (Box 410) the loading of the processors.

Figure 5:
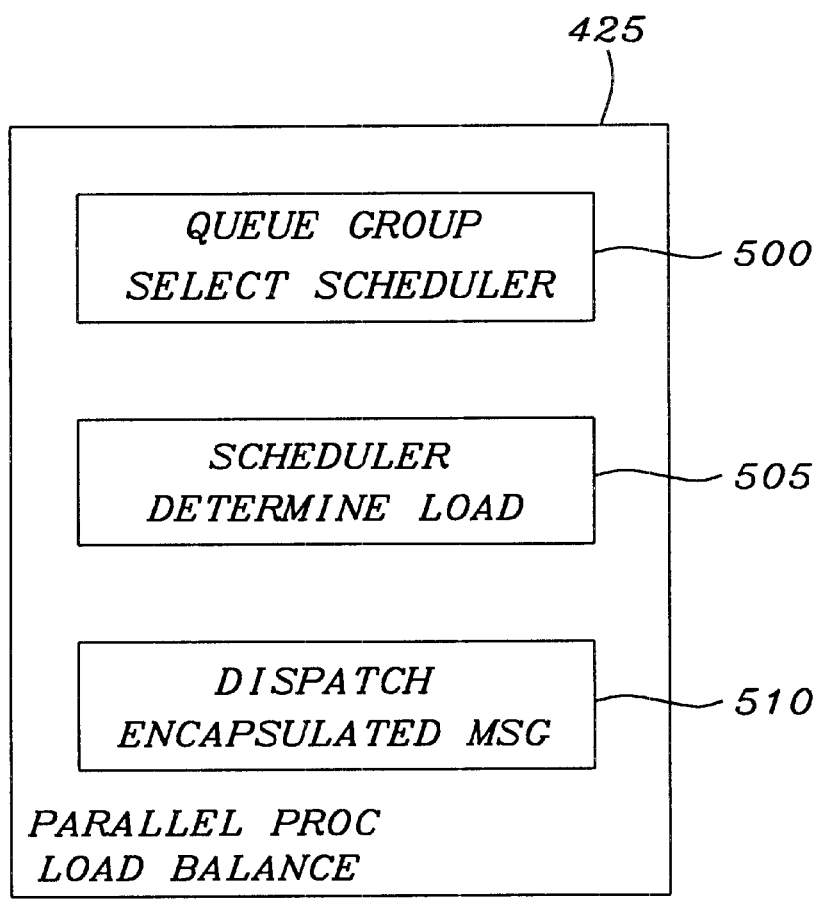
FIG. 5 is a flow diagram of the parallel processor load balancing of the method for monitoring and processing WIP status data of this invention.

FIG. 5 illustrates the steps for the load balancing (Box 410). As described above the distributed queue group of parallel computers selects (Box 500) one of the group as a scheduler for the whole queue group. The scheduler determines the loading (Box 505) of each computer and then dispatches (Box 510) the converted and encapsulated WIP status data message to the computer having the lightest loading. This load balancing allows expeditious compilation and logging of the WIP status data.

Figure 6:
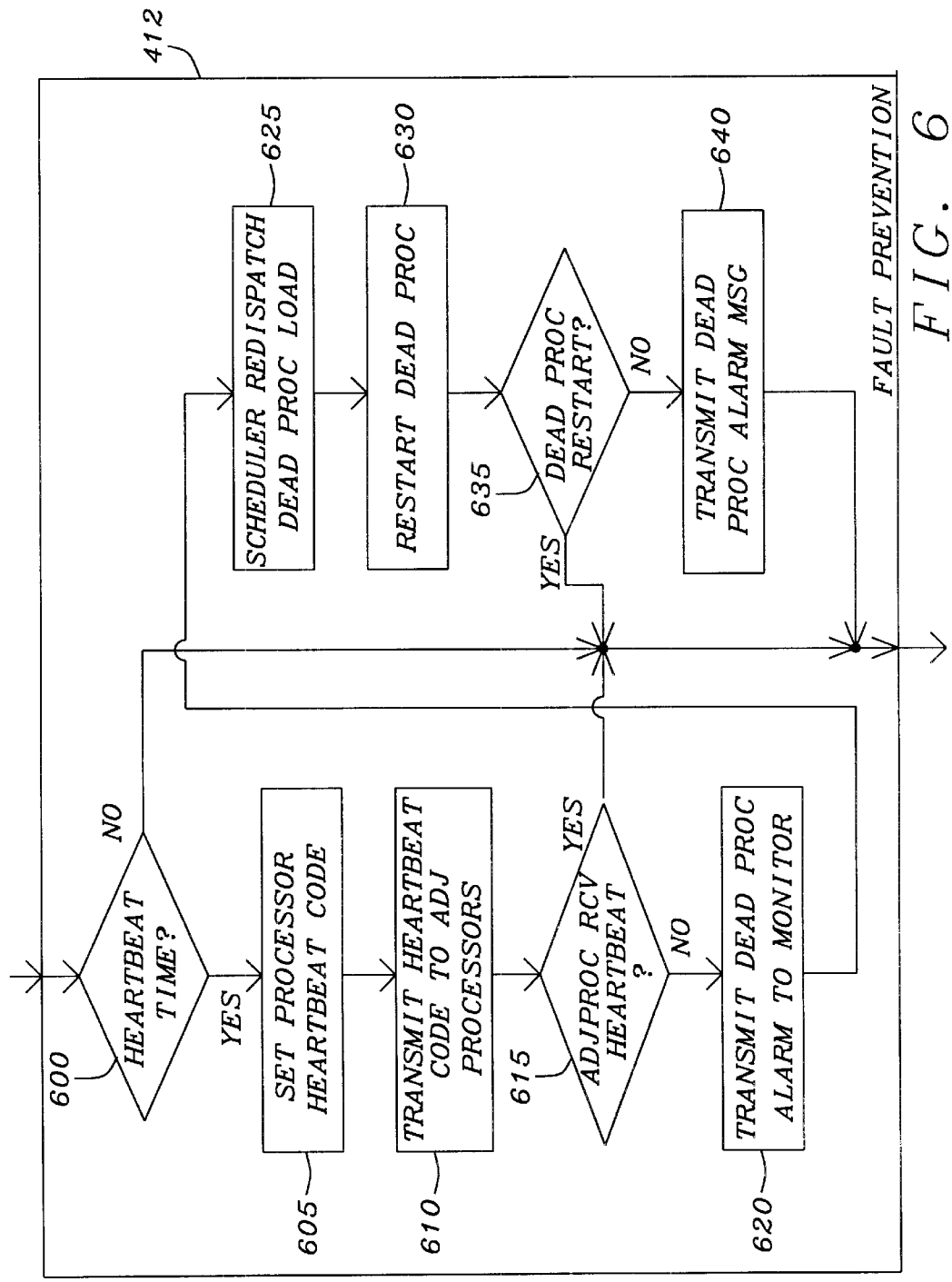
FIG. 6 is a flow diagram of the diagnostic messaging (heartbeat) for fault prevention of the method for monitoring and processing WIP status data of this invention.

Returning to FIGS. 4*a* and 4*b*, the distributed queue groups of parallel computers provide fault prevention and detection (Box 412). Refer now to FIG. 6 for a discussion of the steps for providing the fault prevention and detection. Each processor periodically generates a diagnostic message or heartbeat. The fault protection process monitors (Box 600) to determine if the time has elapsed for the generation of the heartbeat. If the time has not elapsed the processors are presumed to be operating and the method of FIGS. 4*a* and 4*b* continues. However, if the heartbeat time has elapsed, each processor of the distributed queue groups sets (Box 605) the heartbeat indicating the functionality of the processor. In the simplest form the heartbeat code will be message in which the processor has a designated bit that is set at the time period indicating operation. If the processor does not set the bit and pass on the message, it is presumed to have failed by the adjacent processors. There other more complicated diagnostic messages defining the operational state of the processors that may be sent, such as a complex processor status message detailing an operational state of the processor.

The generated heartbeat code in the preferred embodiment is sent (Box 610) to adjacent processors of the distributed queue. The adjacent processors then test (Box 615) for the arrival of the heartbeats from other adjacent processors. If the adjacent processors receive the heartbeat diagnostic message the method of FIGS. 4a and 4b continue. However, if the heartbeat indicates that the sending processor has failed (no heartbeat arriving), the receiving processor transmits (Box 620) a failure alarm to the system monitor. The scheduler of the distributed queue group reschedules and redispatches (Box 625) the converted and encapsulated WIP status data to other processors of the distributed queue group. Alternately, the adjacent processors could assume the loading from the failed processor.

The system monitor attempts to restart and reinitiate (Box 630) the failed processor. If the processor restarts (Box 635), it reassumes its loading and the method of FIGS. 4a and 4b continue. If the failed processor does not restart (Box 635), the system monitor transmits (Box 640) an alarm message to a responsible person to institute repair of the failed processor. The alarm messages may be sent via email, a telephonic message, or a pager message. The distributed queue of processors continue to perform the method of FIGS. 4a and 4b with the failed processor eliminated from the system.

Figure 7:
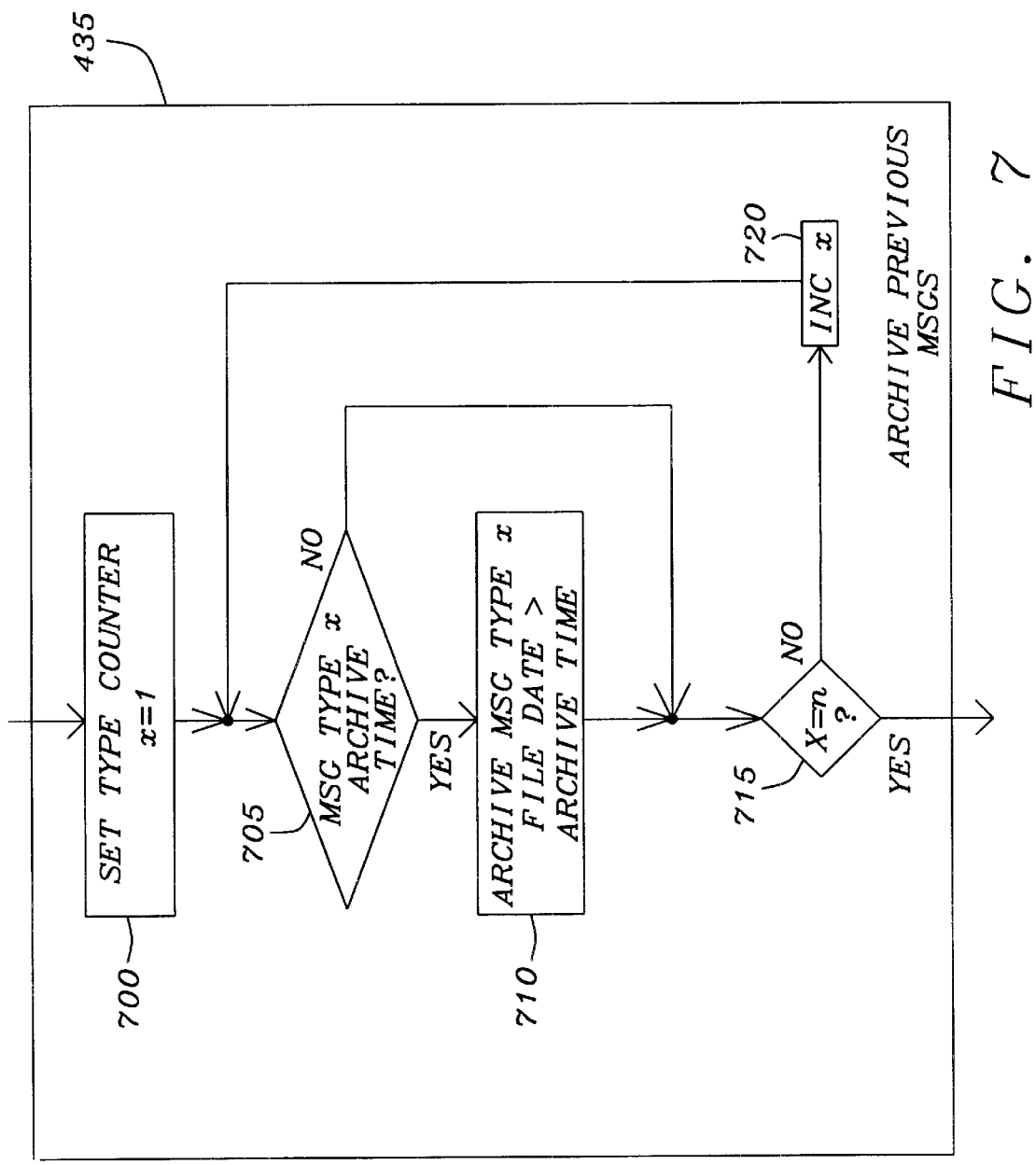
FIG. 7 is a flow diagram of the archiving of WIP status data of the method for monitoring and processing WIP status data of this invention.

Returning back to FIGS. 4a and 4b, the method continues with the archiving (Box 414) of information and messages stored in the message log database, the error log database, and the WIP status data pool database. The steps for the archiving are shown in FIG. 7. The archiving (Box 414) examines the information and messages and depending on a scheduling for archiving, the information and messages that were created before the scheduled dates and times are archived to a remote archival storage unit. For instance, the WIP status data for product that has completed fabrication and has been shipped would be archived after a retention time of six months. Alternately, WIP status data for product that was scrapped or otherwise had its fabrication terminated, would be archived after a retention time of just two months. This prevents the information and messages store in the message log database, the error log database, and the WIP status data pool database from exceeding the limits placed on the table sizes and the storage space of the individual storage devices.

The steps of archiving (Box 414) begin with initializing (Box 700) a type counter x. The type counter designates the types of files to be archived from the message log database, the error log database, and the WIP status data pool database. The time for archiving for a database designated by the counter x is compared (Box 705) to a timer. If the data type indicated by the counter is not to be archived. The counter is compared (Box 715) to the number of types of data types. If all the data types have not been examined for archiving, the type counter x is incremented (Box 720) and the data type is compared (Box 705) for archiving time. If the time is set for archiving the particular data type, the files of the data type having a filing time older or greater than the archive time are transported (Box 710) to an archiving backing storage unit. When all the data types x are examined for and those designated for archiving are transported to the archiving backing storage unit, the method of FIGS. 4a and 4b are continued.

Returning to FIGS. 4a and 4b, the converted and encapsulated WIP status data messages are processed (Box 416). The processing (Box 416) consists of logging the WIP status data messages for error logging and processing for determining the status of the fabrication lines for business concerns.

The method continues with the examination (Box 418) for exceptions in the WIP status data or operation of the heartbeat for the fault protection. If there is an exception, the exception is logged (Box 420) to an error log database and dependent upon the severity, an alarm is transmitted (Box 422) by email, telephone message, or pager message to a responsible person for their attention. If there is no exception, the stage event indicated by the WIP status data is registered (Box 422) in a message ledger of the message log 426 to prevent loss of the WIP status data message. The WIP status data message having the stage event is then published (Box 424) to subscribing users. Each user of the WIP status data information must subscribe (Box 428) to those WIP status data messages that pertain to their needs and interests. For instance a customer must know the progress of each order through the fabrication facility. Whereas, a manufacturing engineer responsible of a particular process of a fabrication line need to know the progress of the particular process of interest. Publishing (Box 424) allows the types of information to be customized to a particular subscribing user.

The subscribing user receives (Box 430) the WIP status data message with the stage event noted. The user examines (Box 432) the message to determine if the user is subscribed to receive the message. If the users is not subscribed, the WIP status data message is discarded (Box 434). However, if the user is subscribed to receive the WIP status data, an acknowledgement message is transferred (Box 436) to the message log 426 for logging of the receipt in the message ledger. The user then processes (Box 438) the WIP status data information in accordance with the user's requirements.

The method then ends until another event causing a stage change within any of the fabrication lines of the enterprise begins the process again. The message logging allows each WIP status data to be a certified message that guaranteed to be delivered. If any processor of the WIP status data fails or any user is unavailable for receiving the message, the message is automatically resent until it is acknowledged for receipt.

The method functions on a parallel processing system that is scalable and flexible. Any failure detected by the heartbeat allows processors to be removed from the system and permits the system to continue to operate albeit in a degraded performance. Any expansion of the number of fabrication lines within factories or building of additional factories within the enterprise are accommodated by the addition of more processors to the parallel distributed queues of processors.

The method for compiling and processing WIP status data of this invention provides a unified and real-time database for subscribing users to view the WIP status data of subjects and classifications that they desire. The method logs every event that generates a WIP status data message and each of the transactions of the WIP database is easily traced through the WIP status data pool and the message log database 426. The structure insures that no WIP status data message is lost and all WIP status data is compiled appropriately. The event driven mechanism that generates the WIP status data messages at the occurrence of a stage change of the fabrication of the product shortens the process cycle time and prevent overloading of the system and prevents failure of the system and the network connecting the system. Further, the method provides timely updating of the WIP status data permits the elimination of problems that are created because of differences in timing of the data transfer from the various MES's. The method as described meets a demand for customers of a semiconductor foundry for immediate real-time information of the status of the fabrication of their products.

While this invention has been particularly shown and described with reference to the preferred embodiments thereof, it will be understood by those skilled in the art that various changes in form and details may be made without departing from the spirit and scope of the invention.

The invention claimed is:

1. A process monitor system in communication with at least one process execution system of a fabrication line to receive process execution status data, and compile and publish said process execution status data to subscribers, said monitor comprising:
at least one publication device, each publication device, in communication with one process execution system for receiving the process execution status data when an event of said fabrication line causes a change in said process execution status data, said publication device converting and encapsulating said process execution status data to a standardized format for publication;
at least one message certification processor, each message certification processor in communication with the publication device to receive the converted and encapsulated process execution status data and each message certification processor logging receipt of said converted and encapsulated process execution status data and verifying receipt by each subscriber of said converted and encapsulated process execution status data; and
at least one status tracking device, each status tracking device in communication with the publication device to receive the converted and encapsulated process execution status data as designated by the encapsulation information, each status tracking device monitoring the encapsulation information of the designated converted and encapsulated process execution status data and from said designated encapsulation information compiling and transferring said designated converted and encapsulated process information to said subscribers.

2. The process monitor system of claim 1 wherein the process execution status data is work in process status transmitted by manufacturing execution systems.

3. The process monitor system of claim 1 wherein said communication system encapsulates said process execution status data with meta-data identifying data types and data structures of said process execution status data.

4. The process monitor system of claim 1 wherein the status tracking device is in communication with the message certification processor to identify subscribers for each converted and encapsulated process execution status data for the logging of publishing and receipt of said converted and encapsulated process execution status data.

5. The process monitor system of claim 1 further comprising an execution status subscriber database in communication with the status tracking device and the message certification processor to receive and provide data records identifying subscribers and that encapsulation information identifying the converted and encapsulated process execution status data said subscribers are to receive.

6. The process monitor system of claim 1 wherein the message certification processors form a distributed queue of processors, wherein one of said message certification processors is designated a scheduling processor to balance a load of all of said message certification processors.

7. The process monitor system of claim 1 wherein the status tracking devices form a distributed queue of processors, wherein one of said message certification processors is designated a scheduling processor to balance a loading of all of said status tracking devices.

8. The process monitor system of claim 1 wherein the message certification processor maintains message ledger files for logging publication and receipt of the converted and encapsulated process execution status data.

9. The process monitor system of claim 1 further comprising an exception monitor in communication with the publication device, each of the message certification processors, and each of the status tracking devices to record all exception errors that occur and to provide an alarm message when exception error occurs.

10. The process monitor system of claim 1 further comprising an autonomous monitoring device in communication with the publication device, each of the message certification processors, and each of the status tracking devices to monitor a diagnostic message generated by the publication device, each of the message certification processors, and each of the status tracking devices periodically indicating an operational state of said publication device, each of the message certification processors, and each of the status tracking devices, and if said operational state indicates a failure transmits a failure alarm.

11. The process monitor system of claim 10 wherein if any of the message certification processors indicate an operational state having a failure, said message certification processor designated as the scheduler reassigns said converted and encapsulated process execution status data to surviving message certification processors.

12. The process monitor system of claim 10 wherein if any of the status tracking devices indicate an operational state having a failure, said status tracking device designated as the scheduler reassigns said converted and encapsulated process execution status data to surviving status tracking devices.

13. The status tracking device of claim 1 further comprising an archiving device connected to the publication device, each of the message certification processors, and each of the status tracking devices to periodically archive the process execution status data, a listing of the subscribers, each logged receipt and verified receipt.

14. A method for receiving process execution status data from a process execution control system, compiling and publishing said process execution status data to subscribers, said method comprising the steps of:
receiving the process execution status data when an event of said process causes a change in said process execution status data;
converting and encapsulating said process execution status data to a standardized format for publication;
logging receipt of said converted and encapsulated process execution status data for publication;
reviewing encapsulation information of the converted and encapsulated process execution status data;
from said encapsulation information, publishing said converted and encapsulated process information to said subscribers; and
verifying receipt by each subscriber of said converted and encapsulated process execution status data.

15. The method of claim 14 wherein the process execution status data is work in process status transmitted by manufacturing execution systems.

16. The method of claim 14 wherein encapsulating wraps said process execution status data with metadata identifying data types and data structures of said process execution status data.

17. The method of claim 14 wherein further comprises the step of identifying subscribers for each converted and encapsulated process execution status data for the logging of publishing and receipt of said converted and encapsulated process execution status data.

18. The method of claim 17 wherein identifying subscribers and identifying the converted and encapsulated process execution status data said subscribers are to receive are retained in an execution status subscriber database.

19. The method of claim 14 further comprising the steps of
providing a plurality of message certification processor to perform the logging and certifying receipt of the converted and encapsulated process execution status data;
forming a distributed queue of the plurality of message certification processors;
designating one of said message certification processors as a scheduling processor; and
scheduling by said scheduling processor of execution of said logging and verifying of said converted and encapsulated process execution status data to message certification processors to balance a load of all of said message certification processors.

20. The method of claim 14 further comprising the steps of
providing a plurality of status tracking devices to perform the logging and certifying receipt of the converted and encapsulated process execution status data; forming a distributed queue of the plurality of status tracking devices;
designating one of said status tracking devices as a scheduling processor; and
scheduling by said scheduling processor of execution of said publishing of said converted and encapsulated process execution status data to status tracking devices to balance a load of all of said status tracking devices.

21. The method of claim 14 wherein the message certification processor maintains message ledger files for logging publication and verifying receipt of the converted and encapsulated process execution status data.

22. The method of claim 14 further comprising the step of:
monitoring for exception errors that occur; and
providing an alarm message when each exception error occurs.

23. The method of claim 14 further comprising the steps of:
generating periodically a diagnostic message indicating an operational state;
if said operational state indicates a failure, transmitting a failure alarm; and
if said operational state indicates a failure, rescheduling the logging and verifying the receipt of the converted and encapsulated process executions status;
if said operational state indicates a failure, rescheduling the publishing the converted and encapsulated process execution status data.

24. The method of claim 14 further comprising the step of periodically archiving the process execution status data, a listing of the subscribers, each logged receipt and verified receipt.

25. An apparatus for receiving process execution status data from a process execution control system, compiling and publishing said process execution status data to subscribers, said apparatus comprising the steps of:
means for receiving the process execution status data when an event of said process causes a change in said process execution status data;
means for converting and encapsulating said process execution status data to a standardized format for publication;
means for logging receipt of said converted and encapsulated process execution status data for publication;
means for reviewing encapsulation information of the converted and encapsulated process execution status data;
means for publishing said converted and encapsulated process information to said subscribers from said encapsulation information; and
means for verifying receipt by each subscriber of said converted and encapsulated process execution status data.

26. The apparatus of claim 25 wherein the process execution status data is work in process status transmitted by manufacturing execution systems.

27. The apparatus of claim 25 wherein the means for encapsulating wraps said process execution status data with metadata identifying data types and data structures of said process execution status data.

28. The apparatus of claim 25 wherein further comprises means for identifying subscribers for each converted and encapsulated process execution status data for the logging of publishing and receipt of said converted and encapsulated process execution status data.

29. The apparatus of claim 28 wherein means for identifying subscribers and identifying the converted and encapsulated process execution status data said subscribers are to receive are retained in an execution status subscriber database.

30. The apparatus of claim 25 further comprising:
means for providing a plurality of message certification processor to perform the logging and certifying receipt of the converted and encapsulated process execution status data;
means for forming a distributed queue of the plurality of message certification processors;
means for designating one of said message certification processors as a scheduling processor; and
means for scheduling by said scheduling processor of execution of said logging and verifying of said converted and encapsulated process execution status data to message certification processors to balance a load of all of said message certification processors.

31. The apparatus of claim 25 further comprising:
means for providing a plurality of status tracking devices to perform the logging and certifying receipt of the converted and encapsulated process execution status data;
means for forming a distributed queue of the plurality of status tracking devices;
means for designating one of said status tracking devices as a scheduling processor; and
means for scheduling by said scheduling processor of execution of said publishing of said converted and encapsulated process execution status data to status tracking devices to balance a load of all of said status tracking devices.

32. The apparatus of claim 25 wherein the message certification processor maintains message ledger files for logging publication and verifying receipt of the converted and encapsulated process execution status data.

33. The apparatus of claim 25 further comprising:
means for monitoring for exception errors that occur; and
means for providing an alarm message when each exception error occurs.

34. The apparatus of claim 25 further comprising:
means for generating periodically a diagnostic message indicating an operational state;

means for transmitting a failure alarm, if said operational state indicates a failure; and means for rescheduling the logging and verifying the receipt of the converted and encapsulated process executions status, if said operational state indicates a failure;

means for rescheduling the publishing the converted and encapsulated process execution status data, if said operational state indicates a failure.

35. The apparatus of claim 25 further comprising means for periodically archiving the process execution status data, a listing of the subscribers, each logged receipt and verified receipt.

36. A computing system in communication with a process execution control system for receiving process execution status data from said process execution control system, said computing system executing a program process compiling and publishing said process execution status data to subscribers, said program process comprising the steps of:

receiving the process execution status data when an event of said process causes a change in said process execution status data;

converting and encapsulating said process execution status data to a standardized format for publication;

logging receipt of said converted and encapsulated process execution status data for publication;

reviewing encapsulation information of the converted and encapsulated process execution status data;

from said encapsulation information, publishing said converted and encapsulated process information to said subscribers; and verifying receipt by each subscriber of said converted and encapsulated process execution status data.

37. The computer system of claim 36 wherein the process execution status data is work in process status transmitted by manufacturing execution systems.

38. The computer system of claim 37 wherein encapsulating wraps said process execution status data with metadata identifying data types and data structures of said process execution status data.

39. The computer system of claim 37 wherein said program process further comprises the step of identifying subscribers for each converted and encapsulated process execution status data for the logging of publishing and receipt of said converted and encapsulated process execution status data.

40. The computer system of claim 39 wherein identifying subscribers and identifying the converted and encapsulated process execution status data said subscribers are to receive are retained in an execution status subscriber database.

41. The computer system of claim 37 wherein said program process further comprises the steps of providing a plurality of message certification processor to perform the logging and certifying receipt of the converted and encapsulated process execution status data;

forming a distributed queue of the plurality of message certification processors;

designating one of said message certification processors as a scheduling processor; and scheduling by said scheduling processor of execution of said logging and verifying of said converted and encapsulated process execution status data to message certification processors to balance a load of all of said message certification processors.

42. The computer system of claim 37 wherein said program process further comprises the steps of providing a plurality of status tracking devices to perform the logging and certifying receipt of the converted and encapsulated process execution status data;

forming a distributed queue of the plurality of status tracking devices;

designating one of said status tracking devices as a scheduling processor; and scheduling by said scheduling processor of execution of said publishing of said converted and encapsulated process execution status data to status tracking devices to balance a load of all of said status tracking devices.

43. The computer system of claim 37 wherein the message certification processor maintains message ledger files for logging publication and verifying receipt of the converted and encapsulated process execution status data.

44. The computer system of claim 37 wherein said program process further comprises the step of:

monitoring for exception errors that occur; and providing an alarm message when each exception error occurs.

45. The computer system of claim 37 wherein said program process further comprises the steps of:

generating periodically a diagnostic message indicating an operational state;

if said operational state indicates a failure, transmitting a failure alarm; and if said operational state indicates a failure, rescheduling the logging and verifying the receipt of the converted and encapsulated process executions status;

if said operational state indicates a failure, rescheduling the publishing the converted and encapsulated process execution status data.

46. The computer system of claim 37 wherein said program process further comprises the step of periodically archiving the process execution status data, a listing of the subscribers, each logged receipt and verified receipt.

47. A medium for retaining a computer program which, when implemented by a computing system that is in communication with a process execution control system to receive a process execution status data, executes a program process for compiling and publishing said process execution status data to subscribers, said program process comprising the steps of:

receiving the process execution status data when an event of said process causes a change in said process execution status data;

converting and encapsulating said process execution status data to a standardized format for publication;

logging receipt of said converted and encapsulated process execution status data for publication;

reviewing encapsulation information of the converted and encapsulated process execution status data;

from said encapsulation information, publishing said converted and encapsulated process information to said subscribers; and verifying receipt by each subscriber of said converted and encapsulated process execution status data.

48. The medium of claim 47 wherein the process execution status data is work in process status transmitted by manufacturing execution systems.

49. The medium of claim 47 wherein encapsulating wraps said process execution status data with metadata identifying data types and data structures of said process execution status data.

50. The medium of claim 47 wherein said program process further comprises the step of identifying subscribers for each converted and encapsulated process execution status data for the logging of publishing and receipt of said converted and encapsulated process execution status data.

51. The medium of claim 50 wherein identifying subscribers and identifying the converted and encapsulated process execution status data said subscribers are to receive are retained in an execution status subscriber database.

52. The medium of claim 47 wherein said program process further comprises the steps of providing a plurality of message certification processor to perform the logging and certifying receipt of the converted and encapsulated process execution status data;

forming a distributed queue of the plurality of message certification processors;

designating one of said message certification processors as a scheduling processor; and scheduling by said scheduling processor of execution of said logging and verifying of said converted and encapsulated process execution status data to message certification processors to balance a load of all of said message certification processors.

53. The medium of claim 47 wherein said program process further comprises the steps of providing a plurality of status tracking devices to perform the logging and certifying receipt of the converted and encapsulated process execution status data;

forming a distributed queue of the plurality of status tracking devices;

designating one of said status tracking devices as a scheduling processor; and scheduling by said scheduling processor of execution of said publishing of said converted and encapsulated process execution status data to status tracking devices to balance a load of all of said status tracking devices.

54. The medium of claim 47 wherein the message certification processor maintains message ledger files for logging publication and verifying receipt of the converted and encapsulated process execution status data.

55. The medium of claim 47 wherein said program process further comprises the step of:

monitoring for exception errors that occur; and providing an alarm message when each exception error occurs.

56. The medium of claim 47 wherein said program process further comprises the steps of:

generating periodically a diagnostic message indicating an operational state;

if said operational state indicates a failure, transmitting a failure alarm; and if said operational state indicates a failure, rescheduling the logging and verifying the receipt of the converted and encapsulated process executions status;

if said operational state indicates a failure, rescheduling the publishing the converted and encapsulated process execution status data.

57. The medium of claim 47 wherein said program process further comprises the step of periodically archiving the process execution status data, a listing of the subscribers, each logged receipt and verified receipt.

* * * * *